(12) United States Patent
Atiya et al.

(10) Patent No.: US 12,177,355 B2
(45) Date of Patent: *Dec. 24, 2024

(54) METHODS AND DEVICES FOR SECURE APPLICATION AUTHENTICATION USING A ONE-WAY ENCRYPTED AUTHENTICATION TOKEN

(71) Applicant: Verizon Patent and Licensing Inc., Basking Ridge, NJ (US)

(72) Inventors: Hany Samir Atiya, Clifton, NJ (US); Jyotsna Kachroo, Millburn, NJ (US); Manuel Enrique Caceres, Basking Ridge, NJ (US); Mauricio Pati Caldeira De Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 299 days.

This patent is subject to a terminal disclaimer.

(21) Appl. No.: 17/665,826

(22) Filed: Feb. 7, 2022

(65) Prior Publication Data

US 2022/0158839 A1    May 19, 2022

Related U.S. Application Data

(63) Continuation of application No. 16/673,227, filed on Nov. 4, 2019, now Pat. No. 11,258,609.

(51) Int. Cl.
| | | |
|---|---|---|
| *H04L 9/32* | (2006.01) | |
| *H04L 9/40* | (2022.01) | |
| *H04W 12/043* | (2021.01) | |
| *H04W 12/71* | (2021.01) | |

(52) U.S. Cl.
CPC .......... *H04L 9/3234* (2013.01); *H04L 9/3239* (2013.01); *H04L 9/3263* (2013.01); *H04L 63/0853* (2013.01); *H04L 63/0876* (2013.01); *H04W 12/043* (2021.01); *H04W 12/71* (2021.01)

(58) Field of Classification Search
CPC ... H04L 9/3234; H04L 9/3239; H04L 9/3263; H04L 63/0853; H04L 63/0876; H04W 12/043

See application file for complete search history.

(56) References Cited

U.S. PATENT DOCUMENTS

| | | |
|---|---|---|
| 6,826,686 B1 | 11/2004 | Peyravian et al. |
| 9,332,433 B1 | 5/2016 | Dotan et al. |
| 10,860,706 B2 | 12/2020 | Kubler et al. |
| 10,868,808 B1 * | 12/2020 | Hohler ................ H04L 63/0807 |

(Continued)

*Primary Examiner* — Beemnet W Dada

(57) ABSTRACT

A client application component of a device may provide a request to an authentication component of the device for an authentication token, in order to authenticate an application with a server. The authentication component may generate the authentication token to be one-way encrypted, based on a server token and a data string associated with security information corresponding to the application, and device information that identifies the device. The client application component may receive the authentication token from the authentication component. The client application component may generate, based on the authentication token, a client token and transmit the client token to the server to authenticate the client application.

20 Claims, 13 Drawing Sheets

(56) References Cited

U.S. PATENT DOCUMENTS

| | | |
|---|---|---|
| 2008/0256616 A1 | 10/2008 | Guarraci et al. |
| 2015/0181418 A1 | 6/2015 | Gargiulo |
| 2019/0052603 A1 | 2/2019 | Wu |
| 2019/0196981 A1 | 6/2019 | Silvert |
| 2019/0305955 A1 | 10/2019 | Verma et al. |

\* cited by examiner

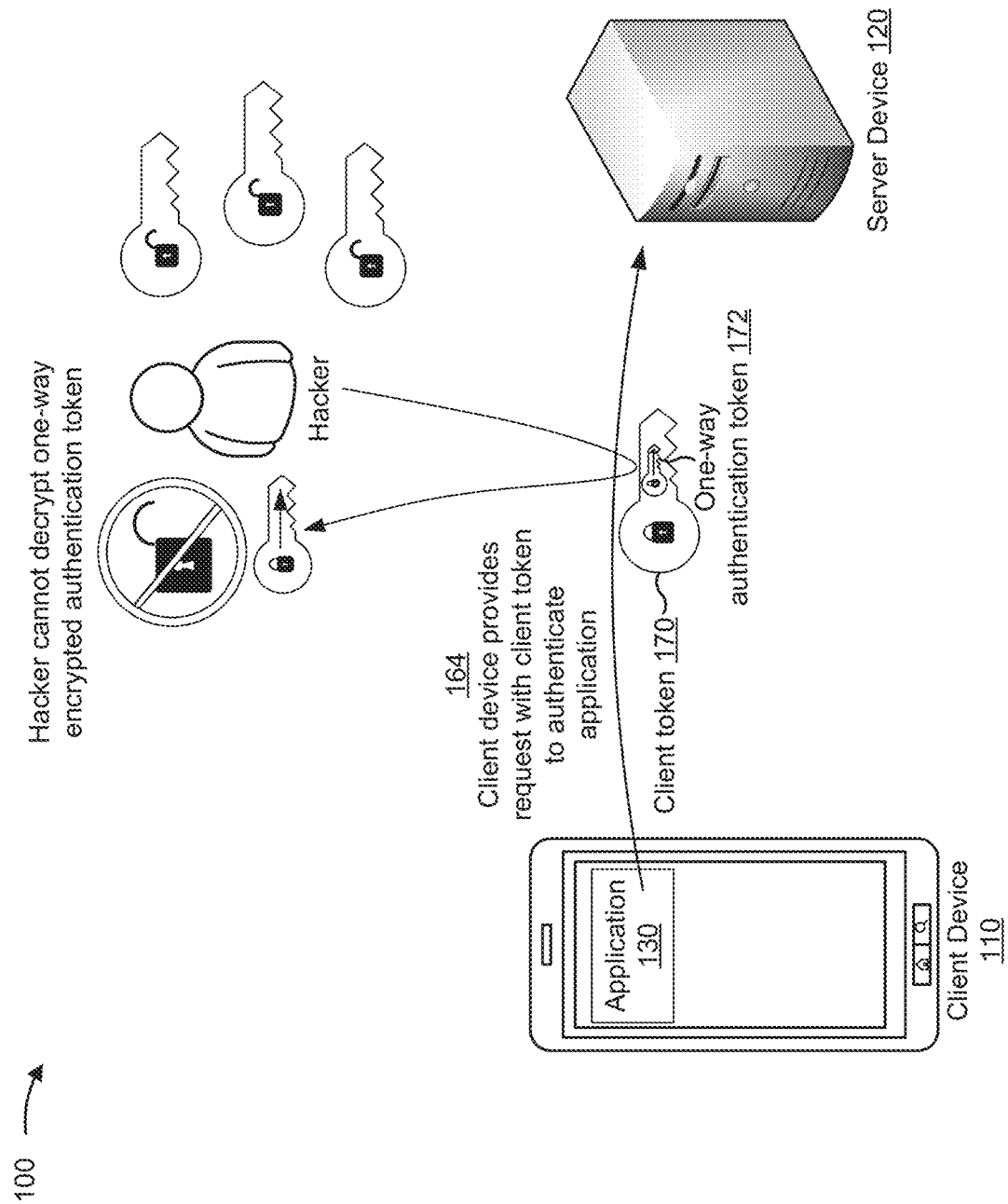

METHODS AND DEVICES FOR SECURE APPLICATION AUTHENTICATION USING A ONE-WAY ENCRYPTED AUTHENTICATION TOKEN

RELATED APPLICATION

This application is a continuation of U.S. patent application Ser. No. 16/673,227, entitled "METHODS AND DEVICES FOR SECURE APPLICATION AUTHENTICATION USING A ONE-WAY ENCRYPTED AUTHENTICATION TOKEN" (now U.S. Pat. No. 11,258,609), filed Nov. 4, 2019, which is incorporated herein by reference in its entirety.

BACKGROUND

Clients may use secure servers to authenticate devices and applications. Some client-server authentication solutions rely on a client-server authentication protocol that is embedded in an encrypted communication channel over an encrypted transport layer (e.g., HyperText Transfer Protocol Secure, or HTTPS). There are open-standard client-server authentication protocols, such as an extensible authentication protocol over transport layer security (EAP-TLS). Another open-standard protocol is an EAP that is based on an authentication and key agreement mechanism (EAP-AKA). There are also proprietary client-server authentication protocols.

BRIEF DESCRIPTION OF THE DRAWINGS

FIGS. 1A-1J are diagrams of one or more example implementations described herein.

DETAILED DESCRIPTION OF PREFERRED EMBODIMENTS

Figure 1A:
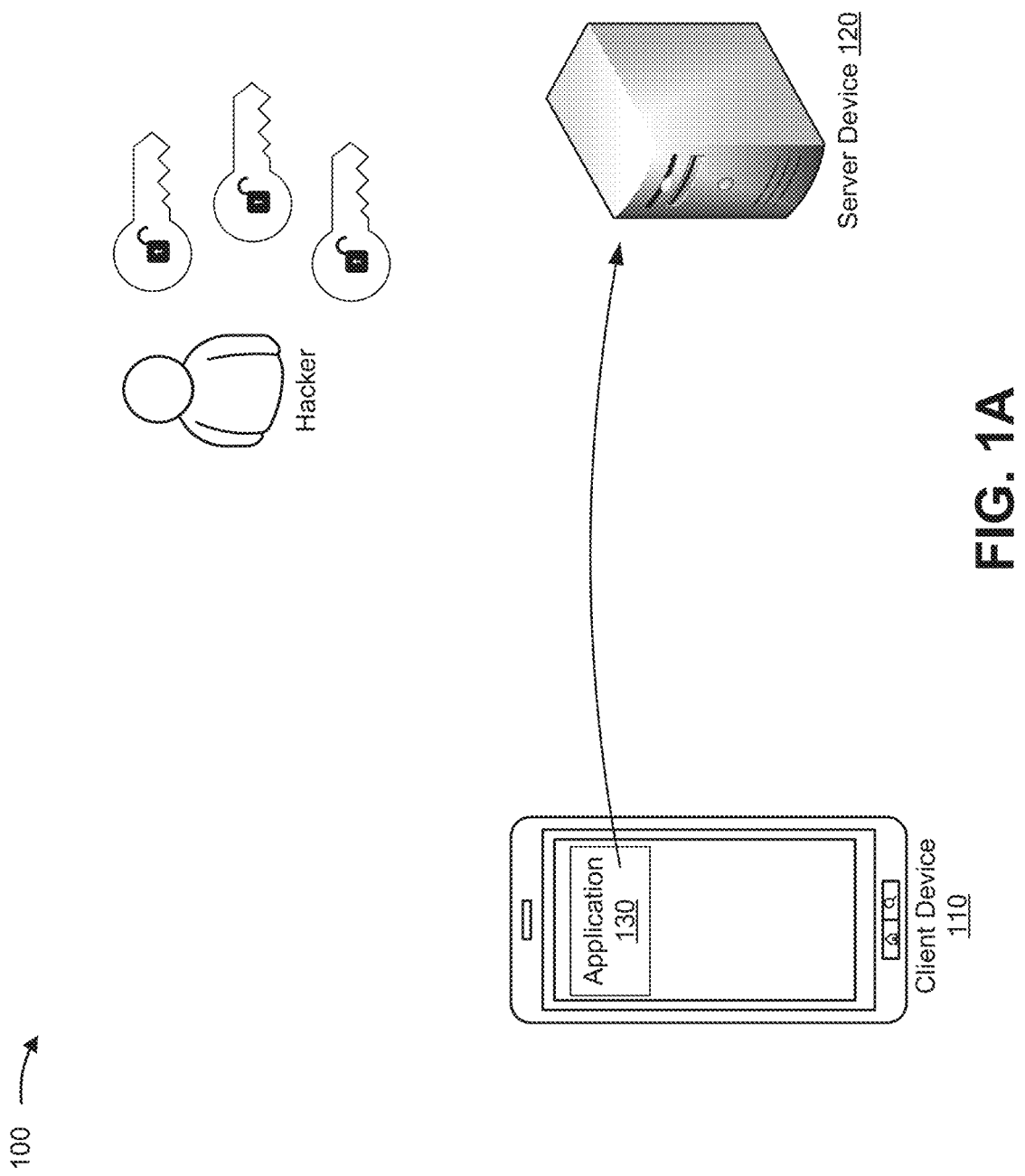

The following detailed description of example implementations refers to the accompanying drawings. The same reference numbers in different drawings may identify the same or similar elements.

A client device (e.g., smartphone, laptop, tablet, smartwatch, and/or the like) may download an application (e.g., for business, social media, health, finance, entertainment, and/or the like) from one of many different sources. The client device may need to determine whether the application is authorized for use on the client device. The client device may provide a request to a server device (e.g., an authentication server) to authenticate the application. This request may involve a client-server authentication protocol that is protected by transmission over an encrypted transport layer (using HTTPS). In such a case, the encrypted transport layer may rely on an encryption key stored on the server device, but this encryption key is not sufficient to secure communications between the client device and the server device. For example, a hacker or other unauthorized user may have obtained the encryption key, "sniffed" communications on an HTTPS channel, decrypted the communications, and/or reverse-engineered the client-server authentication protocol that will be used to authenticate the client device's application. Once the hacker or unauthorized user has figured out details of the client-server authentication protocol, the client device may be compromised. The hacker may be able to fake authentication of an application on the client device and the client device may waste networking and/or computing resources (e.g., processor resources, memory resources, power resources and/or the like) carrying out operations that are unauthorized or that may prevent a user of the client device from using its computing resources. The client device may also waste networking and/or computing resources determining that an application was not properly authenticated, recovering from a breach of security due to execution of an unauthenticated application, and eventually replacing the application and client-server authentication protocol that was compromised.

According to some implementations described herein, a client device may use a one-way encrypted authentication token to authenticate an application. For example, the client device may provide a request to a server device to authenticate the application. The request may include a client token that has the one-way encrypted authentication token. The authentication token may be a one-way hash. One-way hashes are computationally infeasible to invert and are not decryptable. Therefore, the one-way hash prevents inversion (reversal) of the authentication token. Accordingly, the server device does not decrypt the authentication token, because the authentication token is not decryptable. The server device may recognize the authentication token and may know how to generate a copy or replica of the authentication token. The server device may generate the copy of the authentication token and compare this copy and the authentication token received in the client token to determine whether to authenticate the application. The server device may then send an authentication message back to the client device, indicating whether the application is authenticated.

In this way, an untrusted or unauthorized actor (e.g., hacker) cannot decrypt the one-way authentication token and compromise the client-server authentication protocol. Accordingly, the client device will not waste networking and processing resources that may be involved with an application that is not truly authenticated. For example, some client applications are provided by third parties and involve financial transactions, personal communications, sensitive information, and/or the like. Implementations described herein increase security for the client device that may execute such applications. The client device may install and open an application on the client device, with the application being truly authenticated. As a result, the client device saves networking and/or computing resources (e.g., processor resources, memory resources, power resources and/or the like) that would otherwise be spent on unauthorized activities that an unauthenticated application may carry out. Furthermore, the client device may conserve networking and/or computing resources that would be spent recovering from a breach of the authentication protocol between the client device and the server device and any resulting execution of an unauthenticated application. This may include networking and/or computing resources that may be spent determining what financial or other sensitive information was compromised, remediating losses involved, and eventually replacing the client-server authentication protocol that was compromised.

FIGS. 1A-1J are diagrams of one or more example implementations 100 described herein. FIG. 1A illustrates a beginning of an interaction between a client device 110 and a server device 120. For example, client device 110 may begin to process an application 130. Application 130 may be, in this non-limiting example, a text messaging application where text messages may be private and include personal information. A user of client device 110 may want to verify that application 130 is authorized by the service provider and is not a spoofed application to collect and exploit personal messages.

Accordingly, before application 130 will be fully processed or executed on client device 110, client device 110 may seek to utilize a secure authentication protocol with server device 120 in order to, for example, authenticate application 130. Client device 110 may prepare to provide a request for server device 120 to authenticate application 130. This request may include a token. However, as shown in a top portion of FIG. 1A, an unauthorized actor (e.g., a hacker) may attempt to steal and decrypt any token sent between client device 110 and server device 120, as part of, for example, a man-in-the-middle (MITM) attack. If the unauthorized actor is able to decrypt the token, the authentication protocol between client device 110 and server device 120 is compromised, and client device 110 may not be able to safely perform authentication operations, such as authenticating a client application.

Figure 1B:
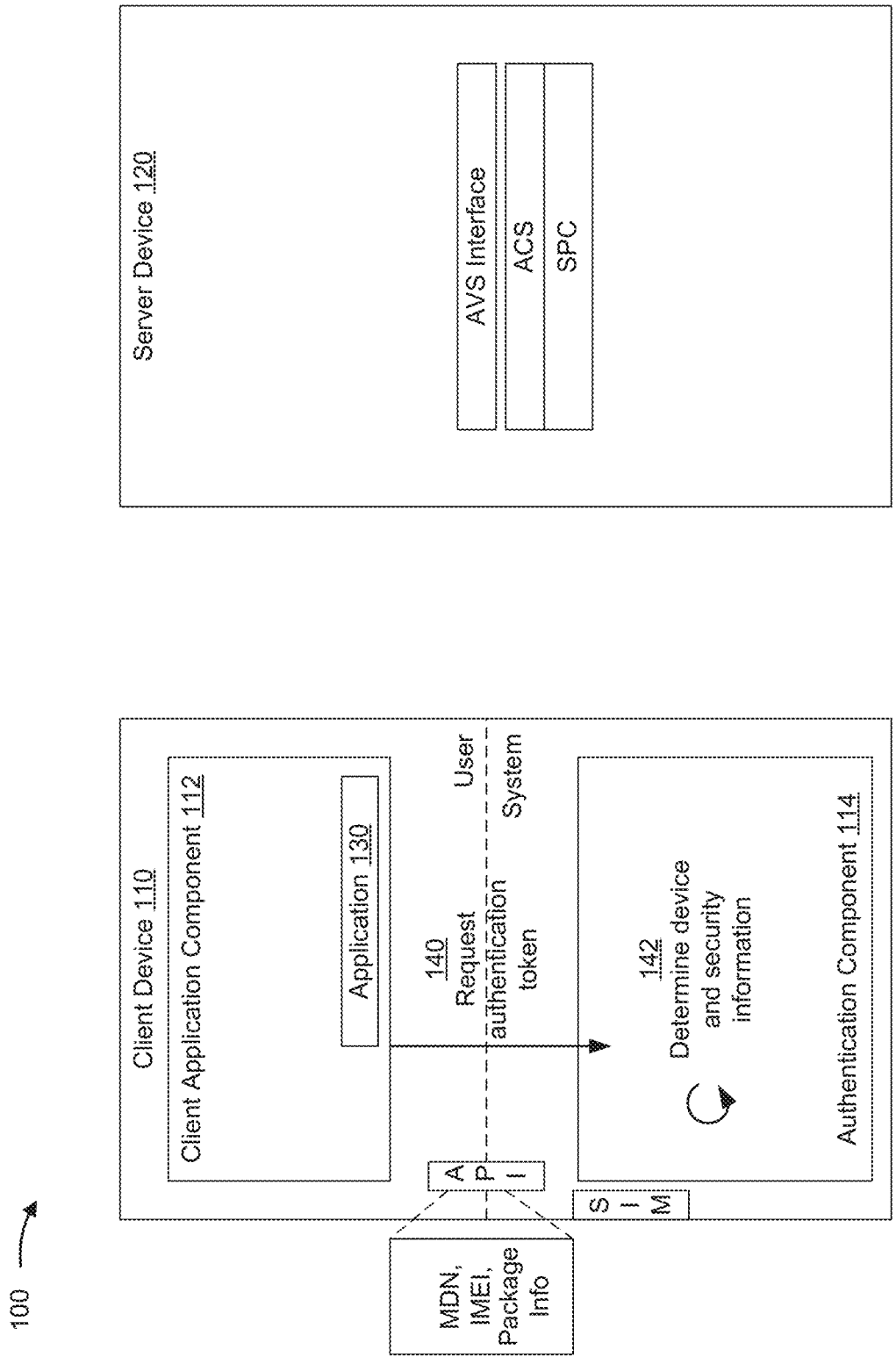

FIG. 1B illustrates some internal components of client device 110 related to the authenticating of application 130. Client device 110 may include a user partition and a system partition in one or more memories. Client device 110 may include a client application component 112 in the user partition to process application 130. Client application component 112 may be responsible for processing application 130, requesting authentication of application 130 from server device 120, and receiving an authentication message indicating whether application 130 is authenticated. However, many actors, trusted and untrusted, may access the user partition of client device 110. By contrast, the system partition of client device 110 may be protected by an operating system of client device 110 and may only be accessible by software developed by trusted actors (e.g., factory installed software). Therefore, client device 110 may include an authentication component 114 in the system partition of client device 110. Authentication component 114 may be protected from unauthorized access in the system partition and may have system-level security that is not available to client application component 112. Authentication component 114 may be responsible for generating authentication tokens.

Authentication component 114 may include an EAP-AKA engine that uses an EAP-AKA authentication protocol. The EAP-AKA engine may be protected in a secure element (e.g., a trusted execution environment), which is like a secure vault. The EAP-AKA engine may provide an additional layer of security for authentication component 114 when authentication component 114 generates authentication tokens. For example, the EAP-AKA engine may invoke system-level application program interfaces (APIs) that untrusted actors may not access. Authentication component 114 may cause the EAP-AKA engine to invoke a system-level API to obtain information that authentication component 114 may need to request or generate a token.

To prepare the request for server device 120, client application component 112 may need to obtain an authentication token. Because client application component 112 and authentication component 114 are separated by a partition divide, client application component 112 may request the authentication token from authentication component 114, as shown by reference number 140.

As shown by reference number 142, authentication component 114 may determine device information and security information needed to generate the authentication token. Authentication component 114 may invoke a system-level API to obtain the device information and the security information. The device information may identify client device 110 and include, for example, a ten digit mobile directory number (MDN), an international mobile equipment identity (IMEI), and/or the like.

The security information may be related to application 130 and may need to be calculated. For example, to obtain the security information, authentication component 114 may obtain package information (e.g., package name) that corresponds to application 130. Authentication component 114 may also obtain a signing certificate corresponding to the package information. Authentication component 114 may calculate a package certificate fingerprint by, for example, hashing the signing certificate for application 130. This package certificate fingerprint may be the security information that corresponds to application 130 (or at least part of the security information).

Authentication component 114 may use the device information, the security information, and/or other pieces of information to form a data string that authentication component 114 may use to generate the authentication token. The data string may include data elements separated with delimiting characters. However, authentication component 114 may need a server token from server device 120 to act as a seed to generate the authentication token. The server token may serve as another layer of protection.

The server token may be a secure server token provided by a subscriber profiler controller (SPC) server, which is shown in FIG. 1B as part of server device 120. The SPC server may be a proprietary and secure network element that is provisioned and/or maintained by a trusted actor. The SPC server is well protected and is part of a security chain. Server device 120 may provide a secure SPC token as a server token to client device 110 upon request, and upon verification of an identity of client device 110.

Server device 120 may include an access control service (ACS) interface associated with the SPC server, to further control access to server device 120. Server device 120 may also include an interface for an application verification service (AVS) that protects access to server device 120 and communications involving server device 120. While one device is shown for server device 120, server device 120 may represent multiple devices.

Referring back to the server token, authentication component 114 may have previously obtained and securely stored the server token from server device 120 in a system memory of client device 110. In this case, authentication component 114 may obtain the server token from the system memory.

Figure 1C:
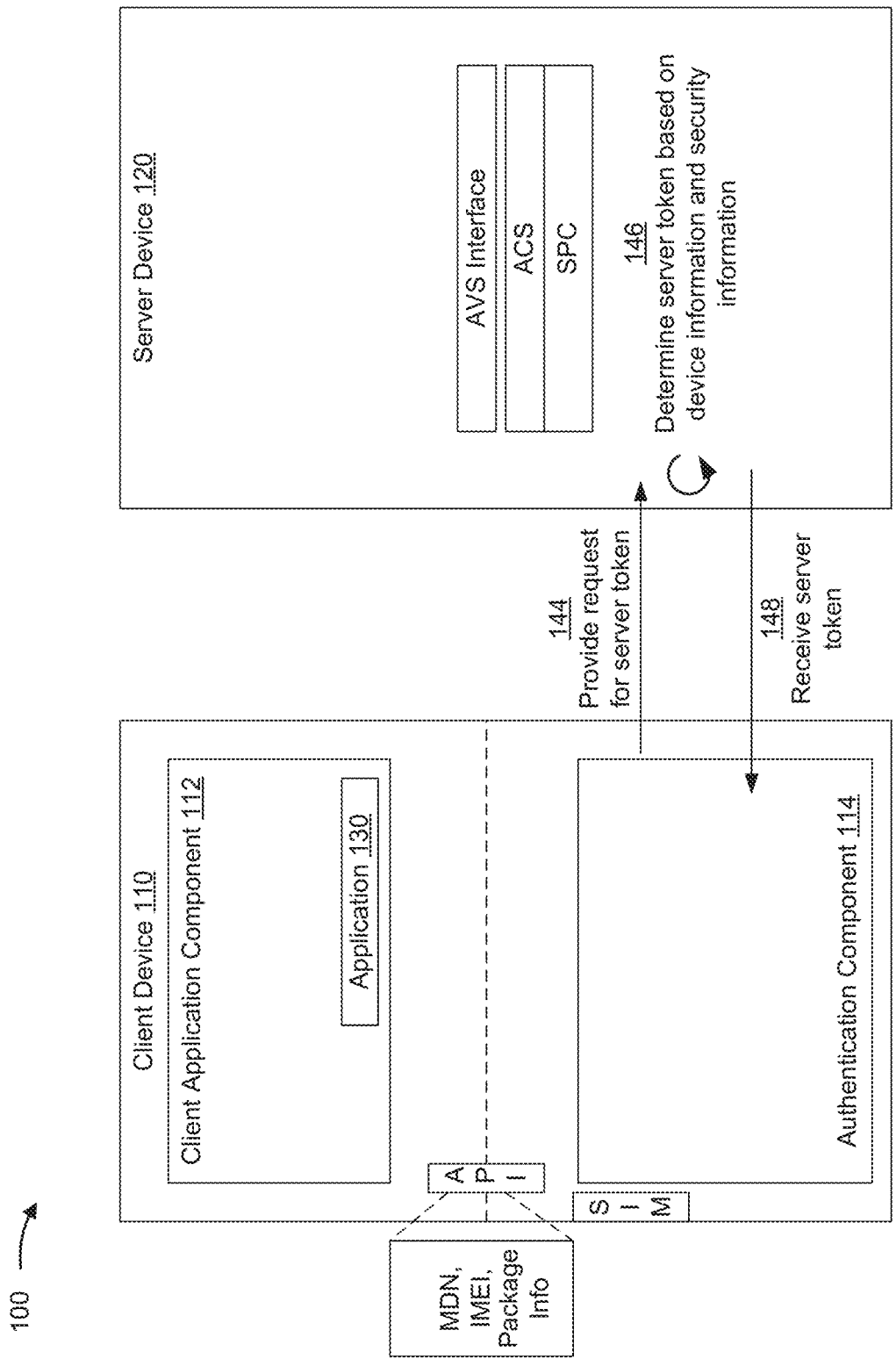

Additionally, or alternatively, authentication component 114 may need to obtain the server token from server device 120. As shown by FIG. 1C and by reference number 144, authentication component 114 may provide a request to server device 120 for the server token. The request may include the device information. The request may also, or alternatively, include the security information.

As shown by reference number 146, server device 120 may determine the server token based on the device information and/or the security information. For example, the SPC server of server device 120 may use the device information to determine a validity of the device requesting the server token. The SPC server may lock out unverified devices.

As for the security information, the SPC server of server device 120 may maintain an access control list (e.g., provided earlier) that contains pairs of package information (e.g., package name) and package certificate fingerprints. The SPC server may also store package certificate fingerprints to avoid unnecessary runtime processing. Server device 120 may compare this security information and the security information provided in the request to make a determination of whether to provide an SPC token as the server token. Based on this determination, server device 120 may look up the SPC token or generate the SPC token. Server device 120 may provide the SPC token to client device 110 as the server token. As shown by reference number 148, client device 110 may receive the server token.

Figure 1D:
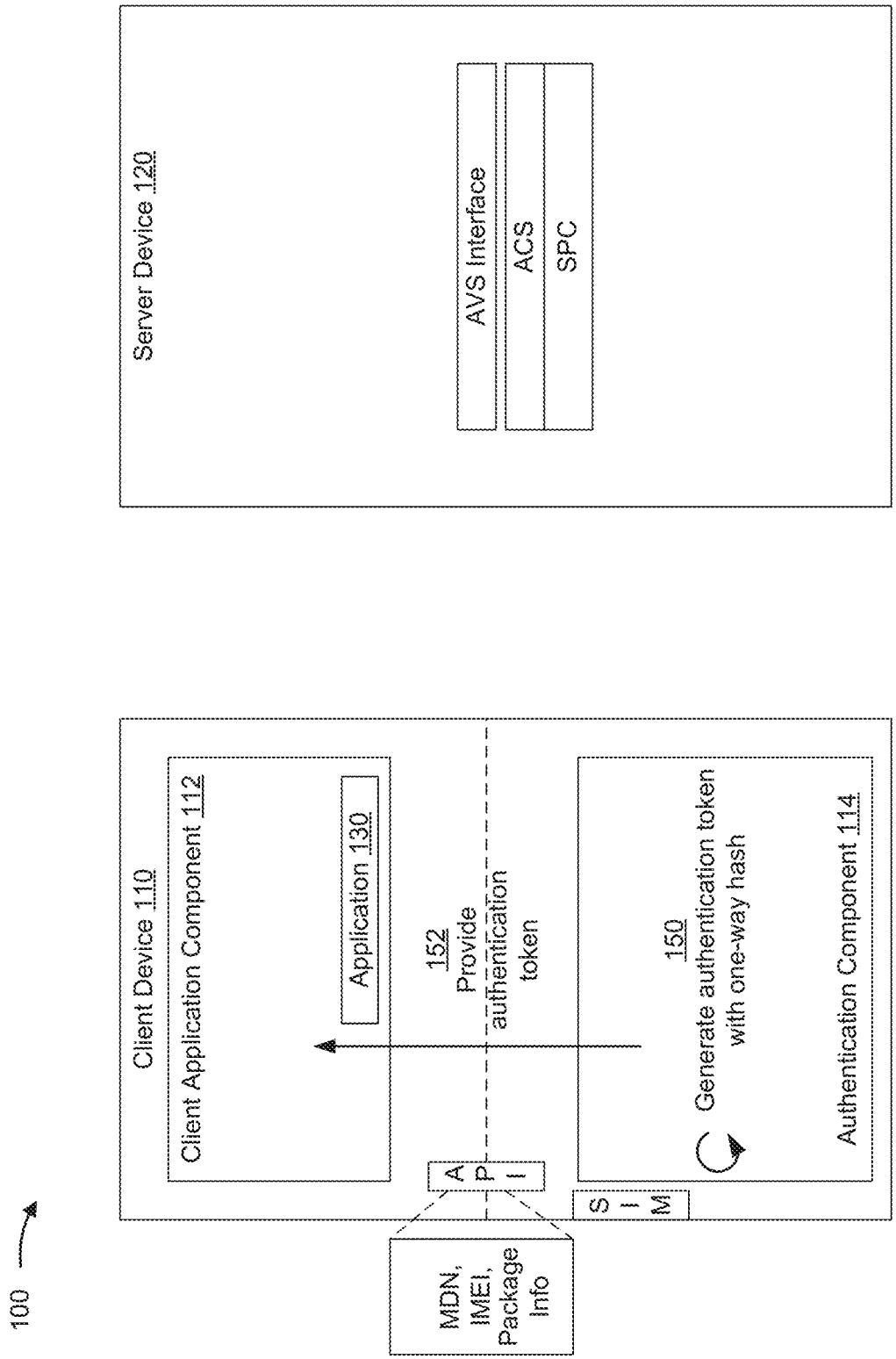

As shown by FIG. 1D and as shown by reference number 150, authentication component 114 may generate the authentication token. Authentication component 114 may generate the authentication token to be one-way encrypted. In some implementations, authentication component 114 may generate the authentication token to be a one-way hash that prevents inversion of the authentication token. For example, the authentication token may generate the authentication token using a hash function of the server token and the data string (described earlier) that is associated with the device information and/or the security information. The hash function may be a keyed-hash message authentication code (HMAC) using a secure hash algorithm (SHA), such as HMAC-SHA256. Other examples of hash functions, which may be used, include SHA-256, SHA-224, SHA-512/224, SHA-512/256, and/or the like. The hash function may be any other hash function variant such as from sets SHA-2, SHA-3, and/or the like. As shown by reference number 152, authentication component 114 may provide the authentication token to client application component 112.

Figure 1E:
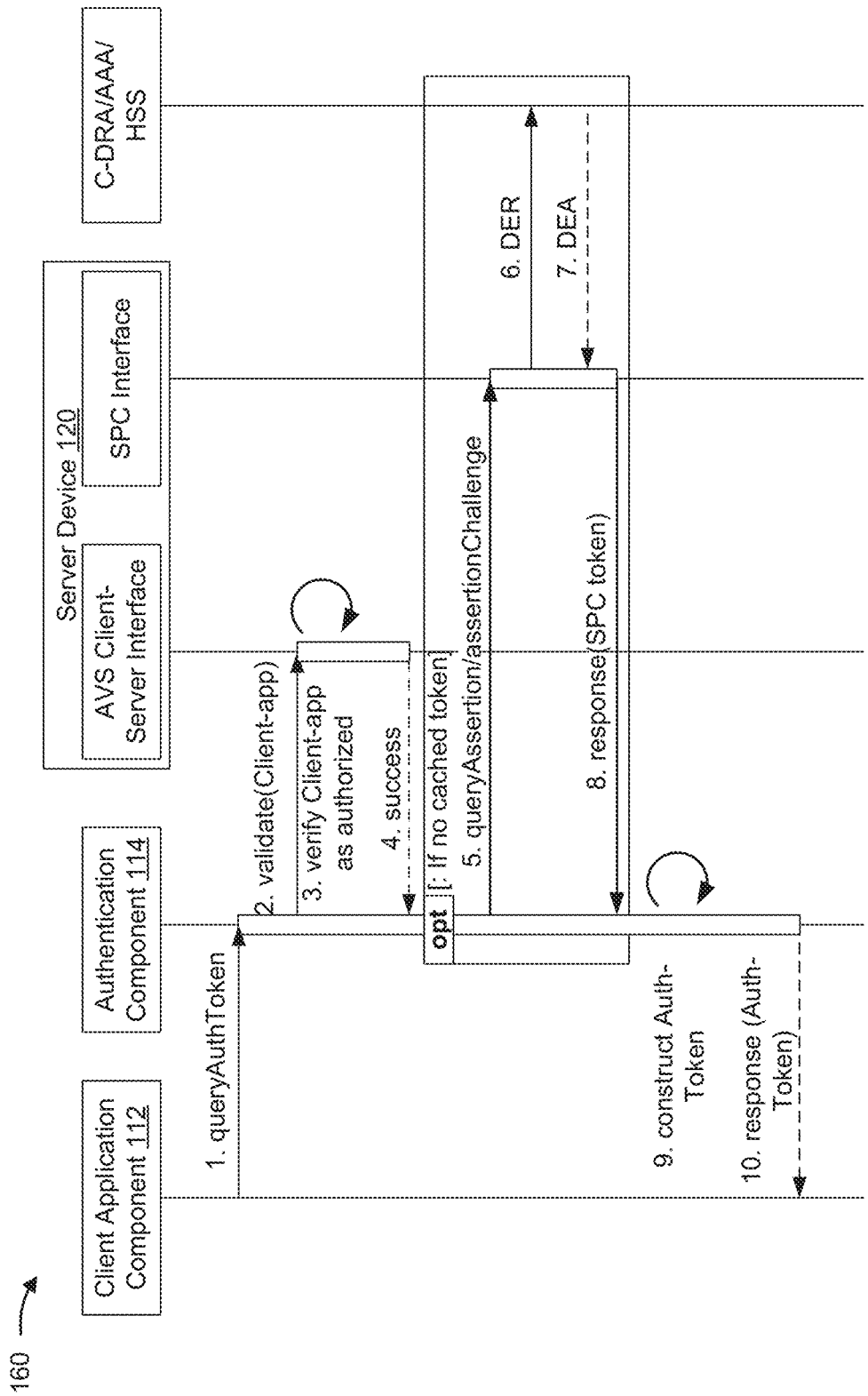

FIG. 1E illustrates a call flow diagram 160 of client application component 112 obtaining an authentication token from authentication component 114, which corresponds to operations shown in connection with FIGS. 1A-1D. As shown by step 1, client application component 112 may send a queryAuthToken message to authentication component 114. At step 2, authentication component 114 may validate client application component 112 (abbreviated as Client-app in FIG. 1E). This may involve sending a validate (Client-App) message to an application verification service (AVS) client-server interface of server device 120 as part of the AVS that validates devices. The AVS was mentioned in connection with FIG. 1B. At step 3, server device 120 may verify that client application component 112 of client device 110 is authorized. At step 4, server device 120 may send a success message to authentication component 114.

FIG. 1E further illustrates that if no server token is cached, authentication component 114 may obtain the server token from the SPC server through an SPC interface of server device 120. At step 5, authentication component 114 may send a queryAssertion or an assertionChallenge message to the SPC interface. If necessary, the SPC interface may send, at step 6, a diameter extensible authentication protocol (EAP) request (DER) to a diameter routing agent (C-DRA), an authentication, authorization, and accounting (AAA) server, and/or a home subscriber service (HSS). A diameter edge agent (DEA) message may be returned at step 7. At step 8, server device 120 sends a response to authentication component 114 with the server token (e.g., SPC token).

At step 9 of FIG. 1E, authentication component 114 may construct the authentication token. At step 10, authentication component 114 may send the authentication token in a response message to client application component 112.

Figure 1F:
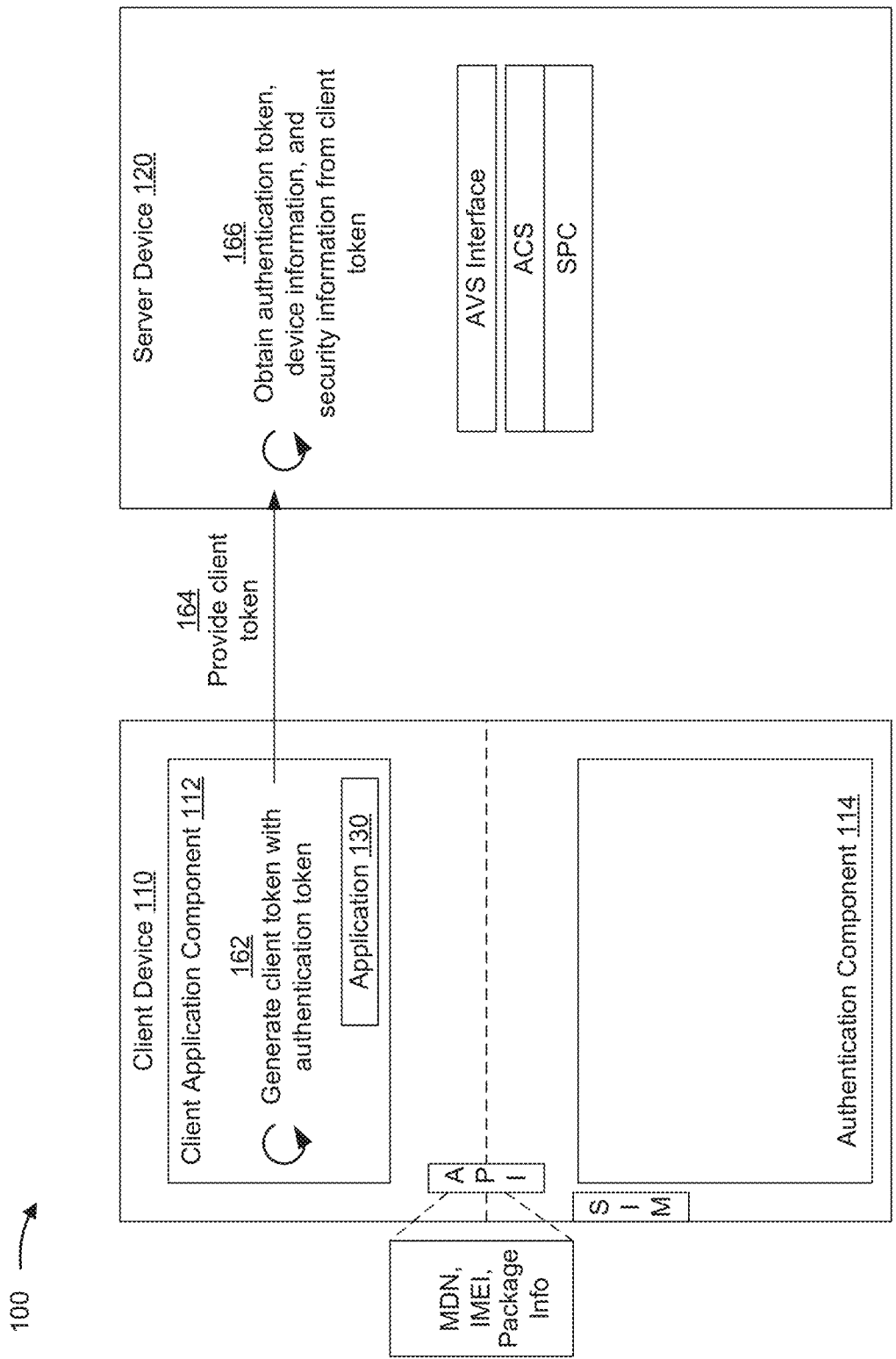

As shown by FIG. 1F and by reference number 162, client application component 112 may generate a client token with the authentication token. Client application component 112 may include the authentication token in the client token. In some implementations, client application component 112 may hash the authentication token. As shown by reference number 164, client application component 112 may provide the client token in the request to server device 120 mentioned in connection with FIG. 1A. The request may include the device information, the security information, and/or other information about application 30.

Additionally, or alternatively, client application component 112 may generate the client token with the device information and/or the security information. That is, client application component 112 may include information in the client token such that everything is transmitted in a single token to server device 120.

As shown by reference number 166, server device 120 may, upon receiving the request with the client token, obtain the authentication token (and possibly the device information and the security information) from the client token. The device information and the security information in the client token may allow for the authentication token to remain anonymous and non-sensitive. Some protocols may use only hashed identities in the authentication token. Server device 120 may have all that is needed to generate a copy of authentication token to match the authentication token.

FIG. 1G illustrates that client device 110 may provide the request with the client token (shown as client token 170) to server device 120, where client token 170 includes the authentication token (shown as authentication token 172). The result of using the authentication token that is one-way encrypted (e.g., using a one-way hash) is that the authentication token is computationally not decryptable. As shown by a top portion of FIG. 1G, even if a hacker steals a key used for an HTTPS communication and decrypts the HTTPS communication, the hacker is prevented from decrypting the HTTPS communication because the authentication token is not decryptable. Because the hacker cannot generate a valid authentication token, the hacker cannot authenticate an application using server device 120 or spoof authentication of its own application.

Figure 1H:
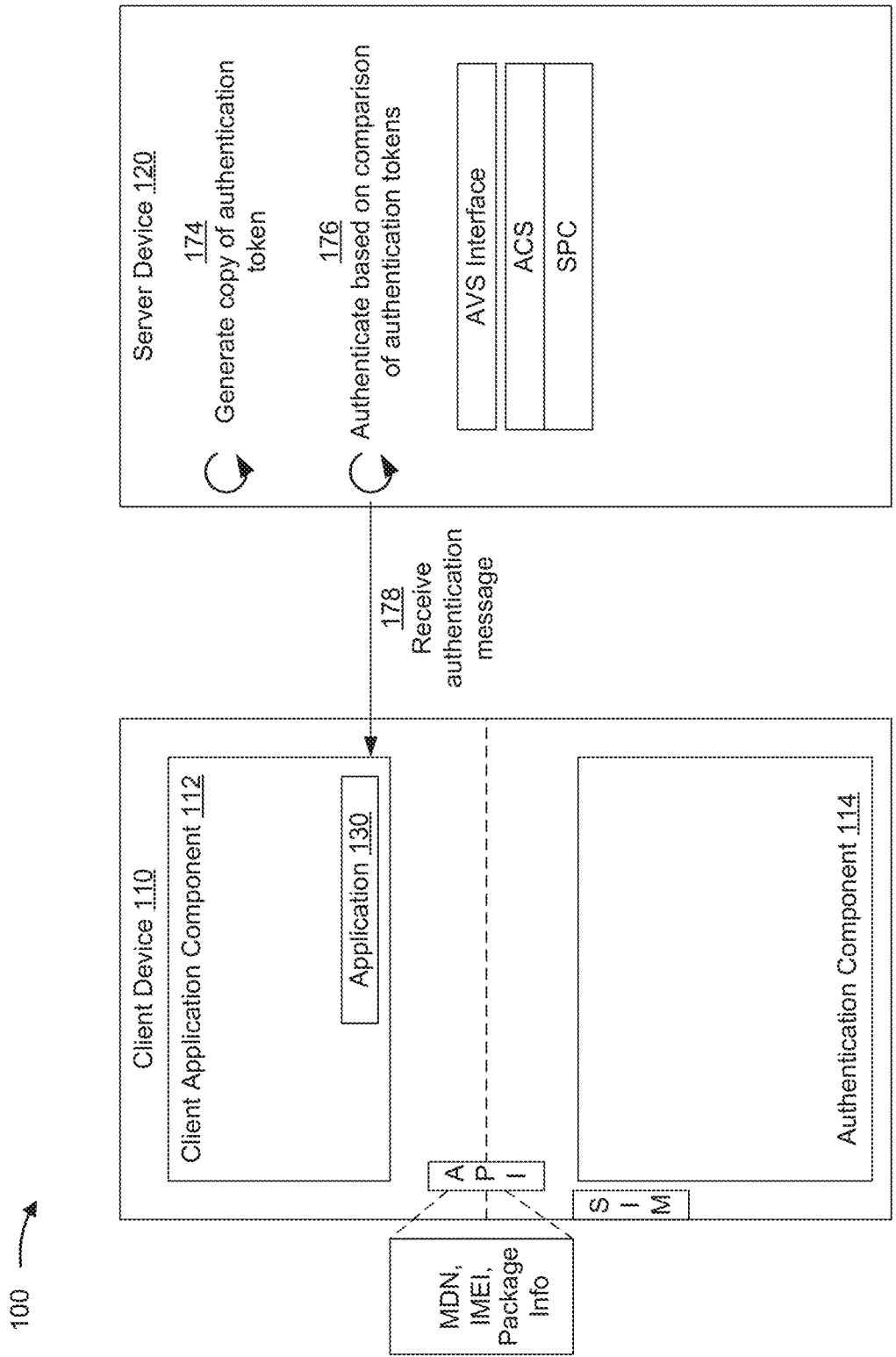

As shown by FIG. 1H, and by reference number 174, server device 120 may generate the copy of the authentication token. Server device 120 may have the information that is needed to generate the copy. As explained in connection with FIG. 1F, server device 120 may have the device information and the security information. Server device 120 may also have the server token that server device 120 provided to client device 110. Additionally, or alternatively, server device 120 may look up and find the server token based on the device information in the client token. Server device 120 may have access to proprietary databases, which may include device information. Server device 120 may also have access to application information and corresponding package information. Therefore, server device 120 may also look up and find a package certificate fingerprint based on package information in the client token or derive the package certificate fingerprint from the client token. In some cases, some of this information may be found elsewhere in the request. As explained above, server device 120 may obtain all elements needed to generate a copy of the authentication token.

Server device 120 may generate the copy of the authentication token. This may include creating a same data string that authentication component 114 created. Server device 120 may use a same hash function on the data string and the server token as was used by authentication component 114. Because the authentication token is generated separately by client device 110 and server device 120 (and with a one-way hash), no intervening parties may decrypt and use the one-way encrypted authentication token. In some implementations, client device 110 and server device 120 may include a timestamp as part of the data string, or at least as part of the hash function.

As shown by reference number 176, server device 120 may perform a comparison of the copy of authentication token and the authentication token obtained from the client token. If server device 120 determines that the copy of the authentication token and the authentication token match, or are equal, then server device 120 may authenticate application 130. If server device 120 determines that the authentication token and the copy of the authentication token do not match or are unequal, then server device 120 may not authenticate application 130.

Server device 120 may provide an authentication message, indicating whether application 130 is authenticated or not. This message may be protected with a token similar to the client token. This message may also include the authentication token or a hash of the authentication token. As shown by reference number 178, client application component 112 may receive the authentication message.

Figure 1I:
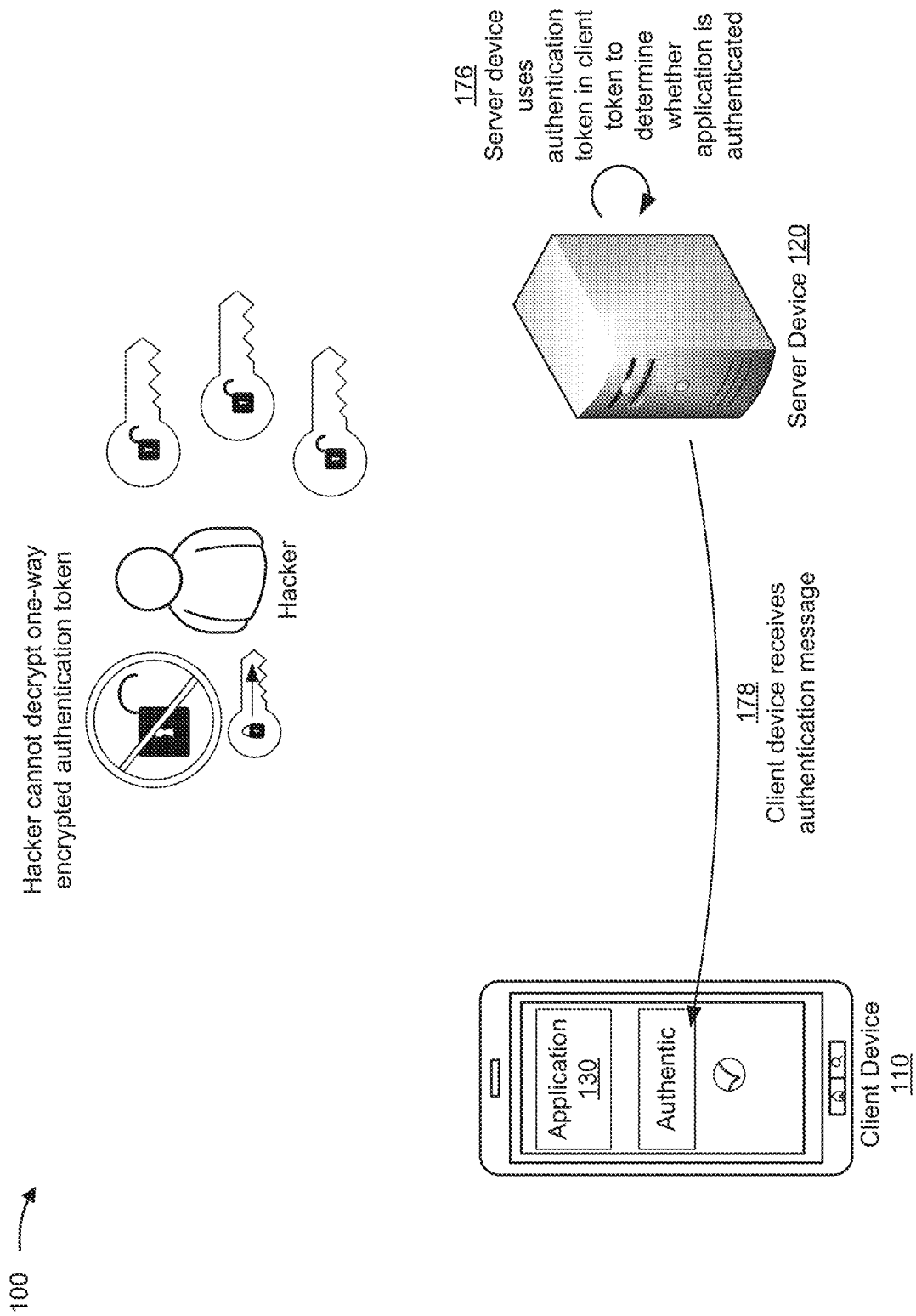

As shown by FIG. 1I, client device 110 may determine that application 130 is authentic. Referring back to the texting application mentioned in connection with FIG. 1A, if the texting application is authentic, then the user may use the texting application with confidence that personal communications on the texting application will be secure and not exploited by an unauthentic texting application. Client device 110 may conserve networking and processing resources by not using the resources for unauthorized (and may be unknown) activities that may be a part of executing an unauthenticated application. Client device 110 and server device 120 may also conserve networking and processing resources that would otherwise be spent remedying a failure in a client-server authentication protocol.

As explained above, client application component 112 of client device 110 may use the authentication token to authenticate application 130. In some implementations, client application component 112 may use authentication tokens in other processes that can benefit from increased security. For example, client device 110 may use the authentication token in relevant transactions set forth by standards or agreements, such as for radio common carrier (e.g., RCC.14) transactions. An example of an RCC.14 transaction is an HTTPS GET to obtain a configuration extensible markup language (XML) file from an ACS interface in server device 120 that is associated with the SPC server.

Figure 1J:
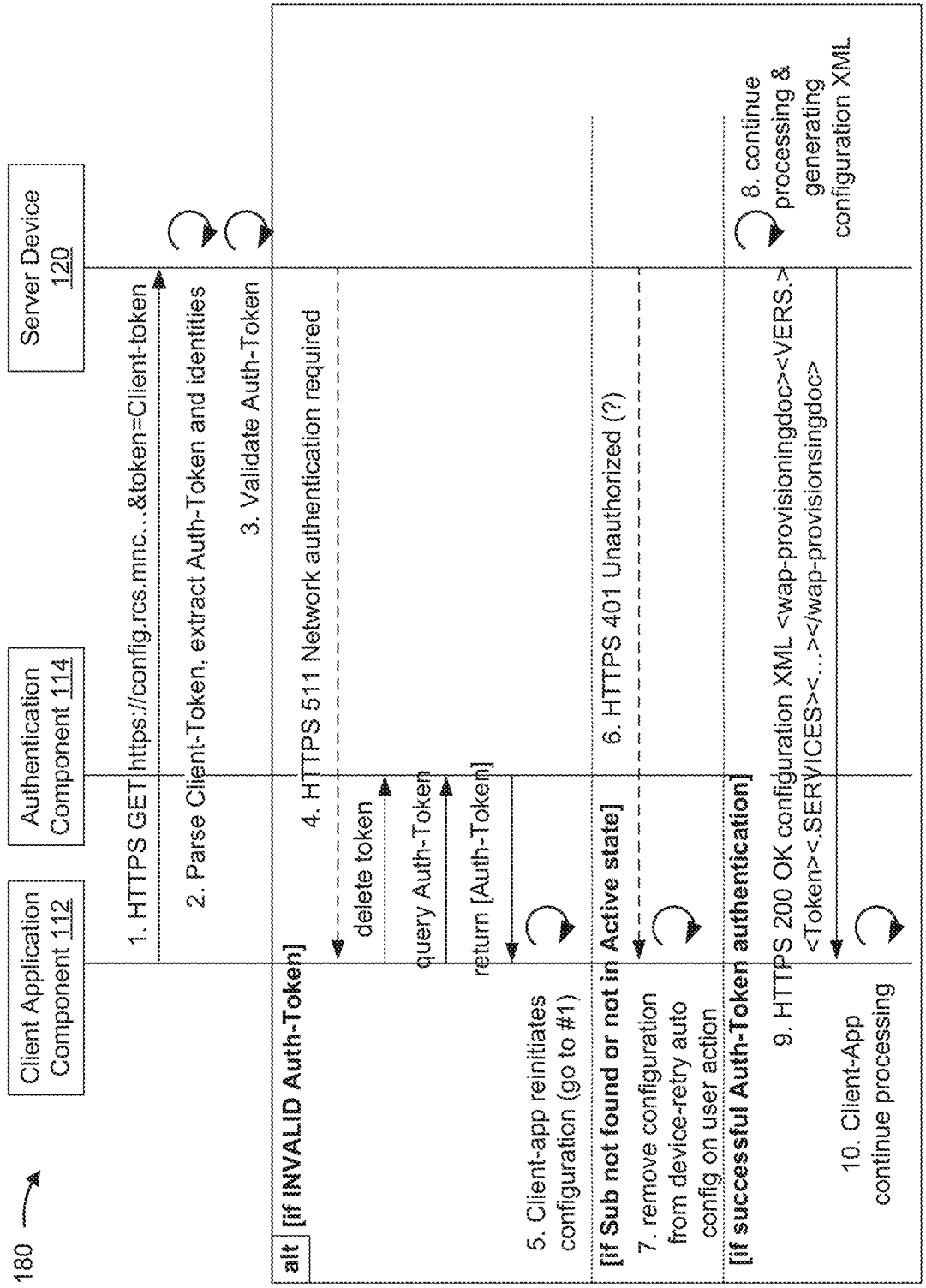

FIG. 1J illustrates a call flow 180 for this example implementation. At step 1, client application component 112 sends an HTTP GET message to obtain a configuration XML file from server device 120. The HTTP GET message may be sent with the authentication token. At step 2, server device 120 parses the client token and extracts the authentication token and relevant identities (e.g., device information). In some implementations, an EAP-AKA authentication protocol used between client device 110 and server device 120 may be configured to incorporate use of the authentication token. For example, the EAP-AKA authentication protocol may include additional APIs to incorporate and parse out the authentication token in the client token. At step 3, server device 120 may validate the authentication token, similar to what was described in connection with FIG. 1H.

In some cases where the authentication token is invalid, server device 120 may require network authentication at step 4. Client application component 112 may send a delete token message and a query authentication token message to authentication component 114, which may return the authentication token. Client application component 112 (abbreviated as Client-app in FIG. 1J) may reinitiate configuration, at step 5.

If the configuration XML file is not found or is inactive (HTTPS 401 message in step 6), client application component 112 may remove a configuration from client device 110 and retry configuration at step 7.

If server device 120 successfully authenticates the authentication token, server device 120 may continue processing and generating the configuration XML, file at step 8. At step 9, server device 120 may provide the configuration XML file. At step 10, client application component 112 may continue processing the configuration XML file.

As indicated above, FIGS. 1A-1J are provided as one or more examples. Other examples can differ from what is described with regard to FIGS. 1A-1J. For example, in practice, there may be networks between the devices, additional devices, fewer devices, different devices, or differently arranged devices than those shown in FIGS. 1A-1J.

Figure 2:
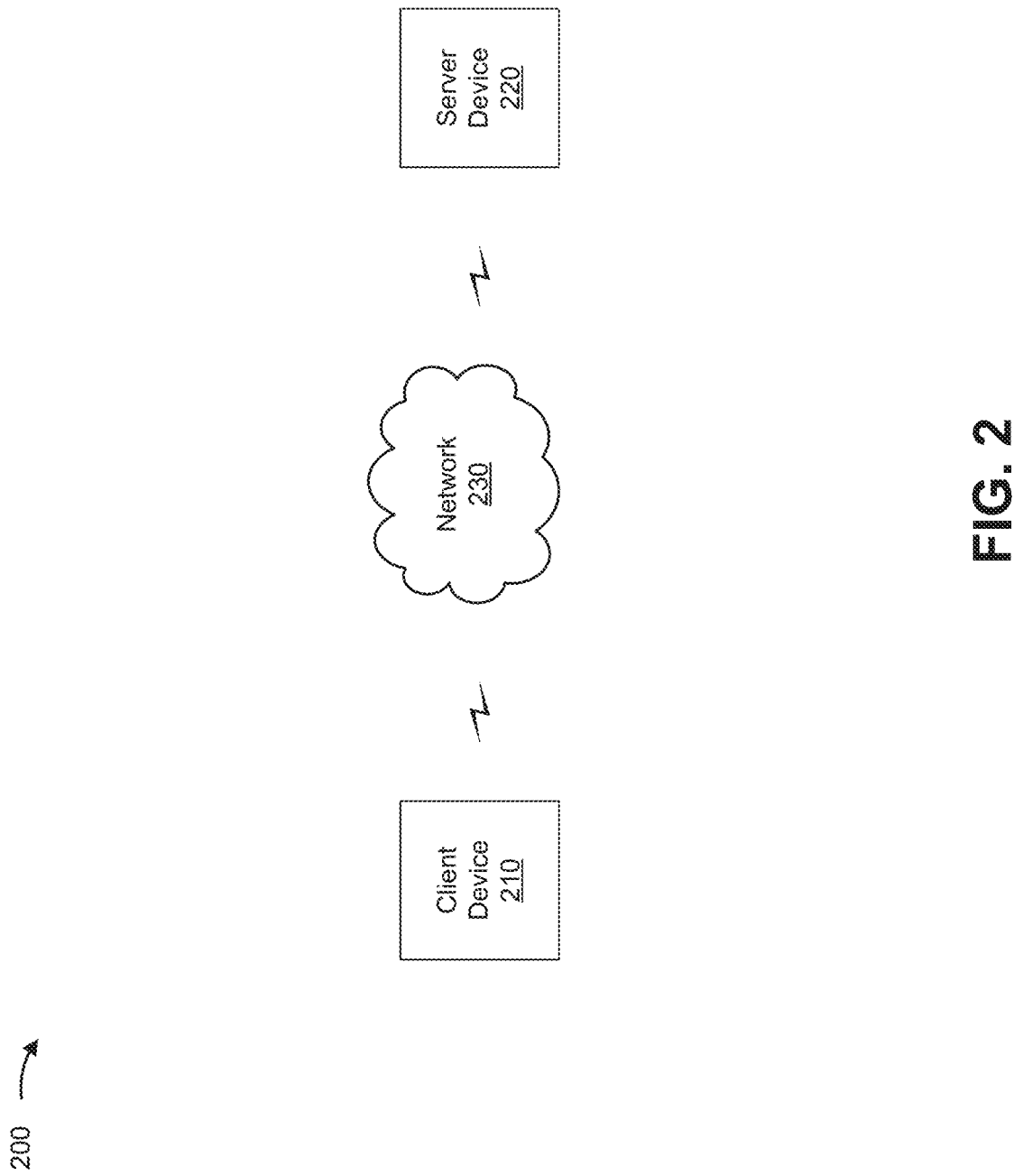
FIG. 2 is a diagram of an example environment in which devices and/or methods described herein may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 includes one or more devices capable of receiving, generating, storing, processing, and/or providing information associated with authenticating an application using a one-way encrypted authentication token, as described above. For example, client device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Server device 220 includes one or more devices capable of receiving, generating, storing, processing, and/or providing information associated with authenticating an application using a one-way encrypted authentication token. For example, server device 220 may include a communication and/or computing device, such as a server, a server farm, a desktop computer, a mainframe computer, a cloud computing environment, a distributed computing environment, or a similar type of device.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
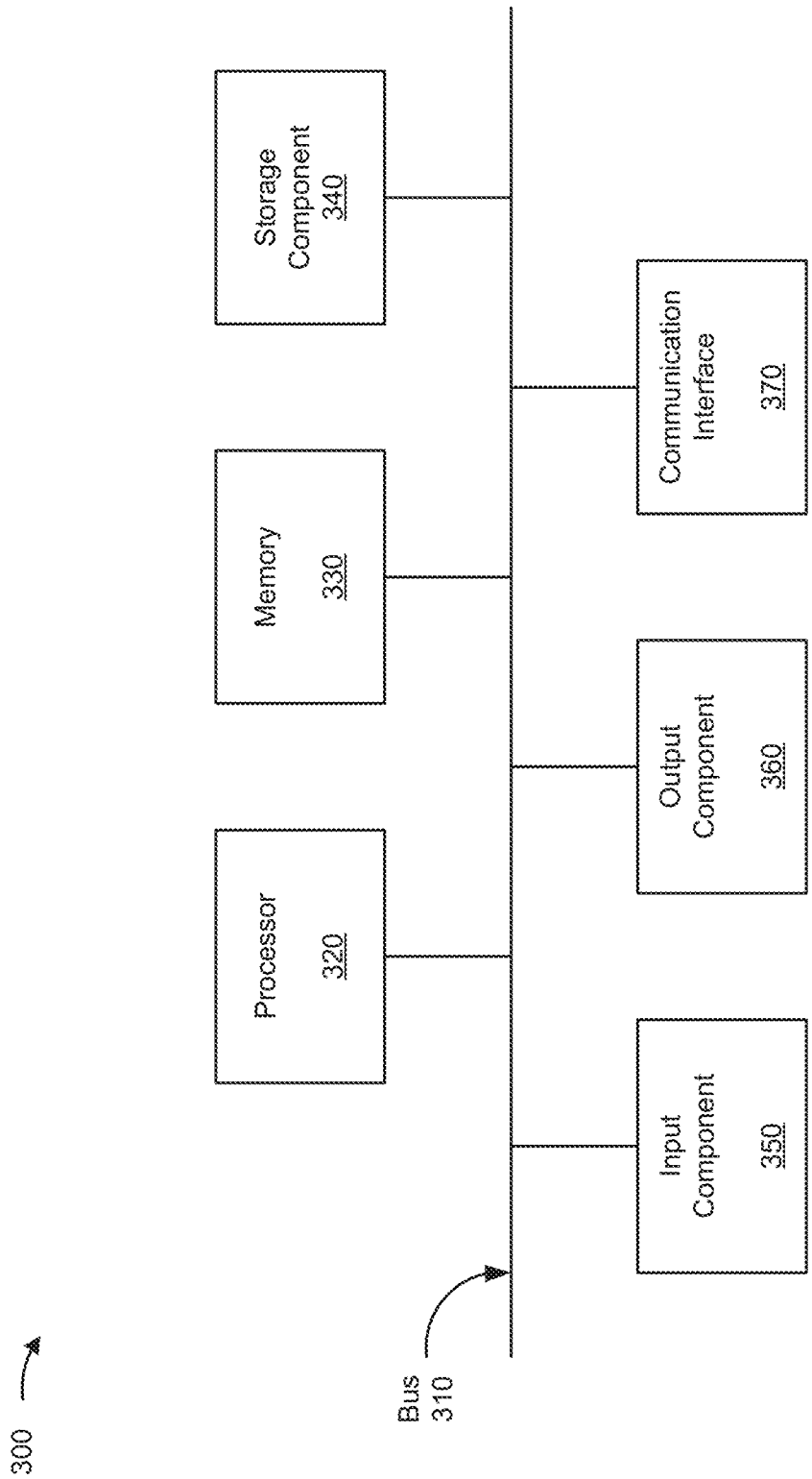
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 330 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
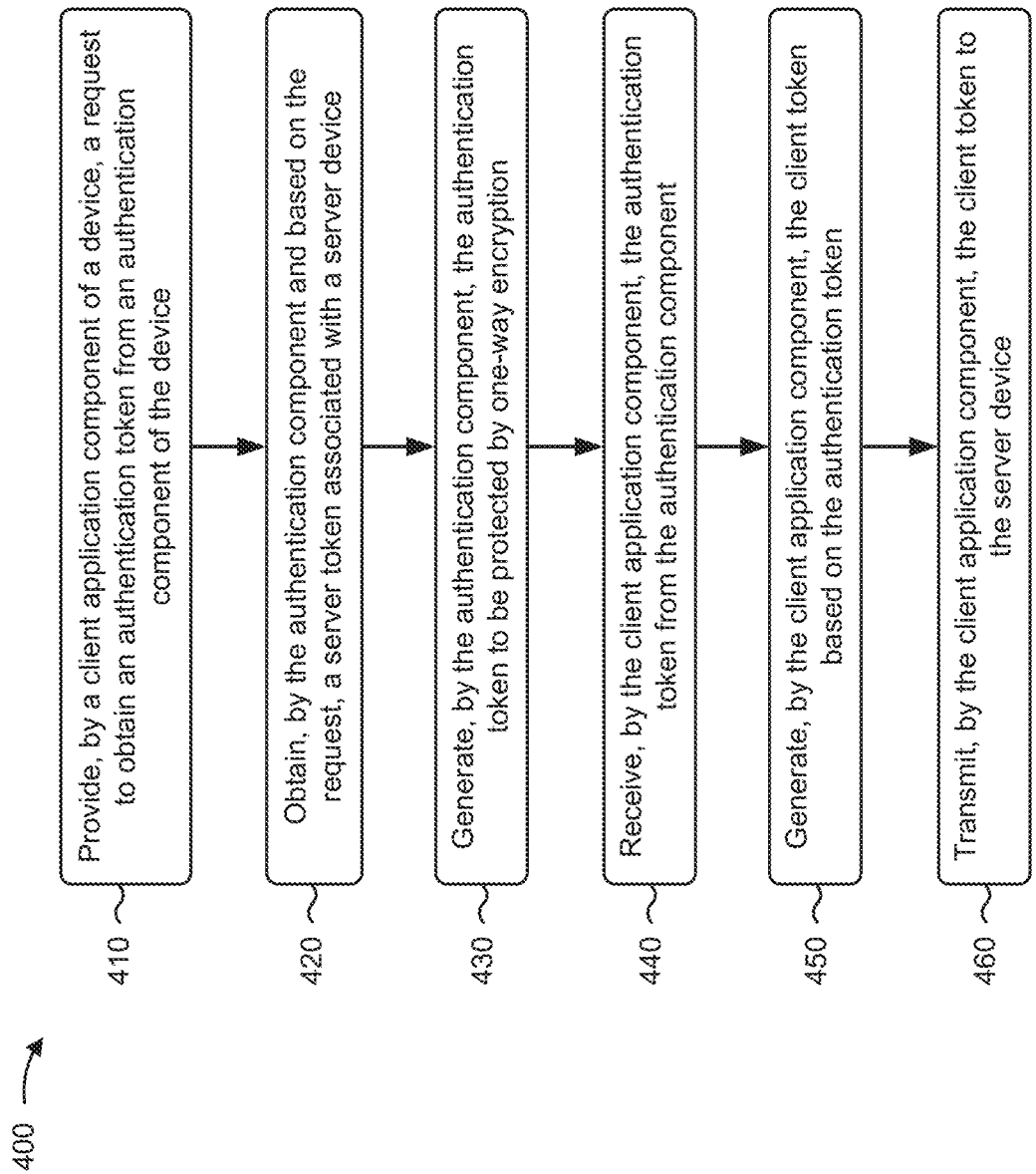
FIG. 4 is a flow chart of an example process for secure application authentication using a one-way encrypted authentication token.

FIG. 4 is a flow chart of an example process 400 for authenticating an application using a one-way encrypted authentication token. In some implementations, one or more process blocks of FIG. 4 may be performed by a client device (e.g., client device 210). In some implementations, one or more process blocks of FIG. 4 may be performed by another device or a group of devices separate from or including the client device, such as a device that is part of an application verification service, a server device (e.g., server device 220), and/or the like.

As shown in FIG. 4, process 400 may include providing, by a client application component, a request to obtain an authentication token from an authentication component of a same device (block 410). In some implementations, the client application component may be configured to authenticate, with a server device, a client application being processed by the client application component. For example, the client application component of the client device (e.g., using processor 320, memory 330, storage component 340, input component 350, output component 360, communication interface 370 and/or the like) may provide a request to obtain an authentication token from an authentication component of the device, as described above.

As further shown in FIG. 4, process 400 may include obtaining, by the authentication component and based on the request, a server token associated with the server device (block 420). The server token may be based on security information corresponding to the client application. For example, the authentication component of the client device (e.g., using processor 320, memory 330, storage component 340, input component 350, output component 360, communication interface 370 and/or the like) may obtain, based on the request, the server token, as described above. In some implementations, obtaining the server token may include obtaining the server token from one or more memories of the client device.

In some implementations, alone or in combination with one or more other implementations, obtaining the server token, by the authentication component, may include obtaining the server token from the server device. This may include determining the security information and device information that identifies the device. The device information may include an MDN and/or an IMEI of the device. Determining the security information may include obtaining package information (e.g., package name) corresponding to the client application, via an API to a system-level component of the device and obtaining signing certificate information corresponding to the package information. The determining may include calculating, based on the package information and/or the signing certificate information, a package certificate fingerprint as part of the security information. In some implementations, the determining may include calculating a package certificate fingerprint as part of the security information, based on the package information, the signing certificate information and a hash function. Obtaining the server token may further include transmitting, to the server device, a request for the server token, where the request includes the device information and the security information. Obtaining the server token may include receiving, based on transmitting the request for the server token, the server token from the server device.

As further shown in FIG. 4, process 400 may include generating the authentication token (block 430). The authentication token may be protected by one-way encryption and may be generated based on the server token and a data string associated with the security information and the device information. For example, the authentication component of the client device (e.g., using processor 320, memory 330, storage component 340, input component 350, output component 360, communication interface 370 and/or the like) may generate the authentication token, as described above.

In some implementations, alone or in combination with other implementations, the client device (e.g., using processor 320, memory 330, storage component 340, input component 350, output component 360, communication interface 370 and/or the like) may generate the authentication token such that the authentication token is protected by one-way encryption by generating the authentication token using a hash function of the server token and the data string. The hash function may be an SHA256 hash function. The authentication component may generate the authentication token so that the authentication token is a one-way hash that prevents inversion of the authentication token.

As further shown in FIG. 4, process 400 may include receiving, by the client application component, the authentication token from the authentication component (block 440). For example, the client application component of the client device (e.g., using processor 320, memory 330, storage component 340, input component 350, output component 360, communication interface 370 and/or the like) may receive the authentication token from the authentication component, as described above.

In some implementations, the authentication component includes an EAP-AKA component (e.g., engine) in a secure element of a system partition of the client device. The EAP-AKA component may obtain the security information and/or the device information. The client device may coordinate with the server device to use an application verification service (AVS) to prevent theft of the authentication token and unauthorized access of the EAP-AKA component.

Accordingly, receiving the authentication token may include the client application component receiving the authentication token only when the client application passes a check by the application verification service and a check by the EAP-AKA component. In some implementations, the authentication component may prevent generation of the authentication token based on determining that the device information is not validated by the application verification service and/or EAP-AKA component of the server device.

As further shown in FIG. 4, process 400 may include generating, by the client application component and based on the authentication token, a client token (block 450). For example, the client application component of the client device (e.g., using processor 320, memory 330, storage component 340, input component 350, output component 360, communication interface 370 and/or the like) may generate, based on the authentication token, a client token, as described above. In some implementations, the client token and/or the authentication token may have been previously generated and stored. If a new authentication token or client token is needed, the old authentication token or client token may be deleted before a new one is generated.

As further shown in FIG. 4, process 400 may include transmitting, by the client application component, the client token to the server device to authenticate the client application (block 460). For example, the client application component of the client device (e.g., using processor 320, memory 330, storage component 340, input component 350, output component 360, communication interface 370 and/or the like) may transmit the client token to the server device. This may be done to authenticate the client application, as described above. The client application component of the client device may receive a message from the server device. In some cases, the message indicates that the client application is authenticated by the server device. In some cases, the message indicates that the client application is not authenticated by the server device.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   providing, by a client application component of a device, a request to obtain an authentication token for an application from an authentication component of the device;
   receiving, by the client application component, the authentication token from the authentication component,
      the authentication token based on a server token and security information related to the application, and
      the server token being based on the security information and associated with a server device;
   generating, by the client application component, a client token by hashing the authentication token; and
   transmitting, by the client application component and to the server device, the client token.

2. The method of claim 1, wherein the authentication token is protected by one-way encryption.

3. The method of claim 1, wherein the authentication token uses a hash function of the server token and a data string associated with the security information.

4. The method of claim 1, further comprising
   transmitting device information with the client token,
      wherein the device information identifies the device, and
      wherein the device information includes:
         a mobile directory number (MDN), or
         an international mobile equipment identity (IMEI).

5. The method of claim 1, further comprising:
   receiving, based on transmitting the client token, a message from the server device,
      the message indicating that the application is authenticated by the server device; and
   processing a configuration file associated with the application based on the message.

6. The method of claim 1, further comprising:
   receiving, based on transmitting the client token, a message from the server device,
      the message indicating that the application is not authenticated by the server device; and
   deleting the client token based on the message.

7. A device, comprising:
   one or more memories and one or more processors, the one or more memories and the one or more processors configured to:
      provide a request to obtain an authentication token for an application from an authentication component of the device;
      receive the authentication token from the authentication component,
         the authentication token based on a server token and security information related to the application, and
         the server token being based on the security information and associated with a server device;
      generate a client token by hashing the authentication token; and
      transmit, to the server device, the client token.

8. The device of claim 7, wherein the authentication token is protected by one-way encryption.

9. The device of claim 7, wherein the authentication token uses a hash function of the server token and a data string associated with the security information.

10. The device of claim 7, wherein the one or more processors are further to
    transmit device information with the client token,
       wherein the device information identifies the device, and
       wherein the device information includes:
          a mobile directory number (MDN), or
          an international mobile equipment identity (IMEI).

11. The device of claim 7, wherein the one or more processors are further to:
    receive, based on transmitting the client token, a message from the server device,
       the message indicating that the application is authenticated by the server device; and
    process a configuration file associated with the application based on the message.

12. The device of claim 7, wherein the one or more processors are further to:
    receive, based on transmitting the client token, a message from the server device,
       the message indicating that the application is not authenticated by the server device; and
    delete the client token based on the message.

13. A non-transitory computer-readable medium storing instructions, the instructions comprising:
    one or more instructions that, when executed by one or more processors of a device, cause the one or more processors to:

provide a request to obtain an authentication token for an application from an authentication component of the device;

receive the authentication token from the authentication component,
the authentication token based on a server token and security information related to the application, and
the server token being based on the security information and associated with a server device;

generate a client token by hashing the authentication token; and transmit, to the server device, the client token.

14. The non-transitory computer-readable medium of claim 13, wherein the authentication token is protected by one-way encryption.

15. The non-transitory computer-readable medium of claim 13, wherein the authentication token uses a hash function of the server token and a data string associated with the security information.

16. The non-transitory computer-readable medium of claim 13, wherein the one or more instructions, further cause the one or more processors to:

receive, based on transmitting the client token, a message from the server device,
the message indicating that the application is authenticated by the server device; and process a configuration file associated with the application based on the message.

17. The non-transitory computer-readable medium of claim 13, wherein the one or more instructions, further cause the one or more processors to:

receive, based on transmitting the client token, a message from the server device,
the message indicating that the application is not authenticated by the server device; and delete the client token based on the message.

18. The method of claim 1, further comprising:

coordinating with the server device to use an application verification service to prevent theft of the authentication token.

19. The device of claim 7, wherein the one or more processors are further configured to:

coordinate with the server device to use an application verification service to prevent theft of the authentication token.

20. The non-transitory computer-readable medium of claim 13, wherein the one or more instructions, further cause the one or more processors to:

coordinate with the server device to use an application verification service to prevent theft of the authentication token.

* * * * *